(12) United States Patent
Jan et al.

(10) Patent No.: US 6,680,148 B2
(45) Date of Patent: Jan. 20, 2004

(54) METHOD FOR FABRICATING A LITHIUM BATTERY WITH SELF-ADHESIVE POLYMER ELECTROLYTE

(75) Inventors: Yih-Song Jan, Taipei (TW); Sheng-Feng Wu, Hsinchu Hsien (TW); Chang-Rung Yang, Taiping (TW); Jien-Chang Chen, Miaoli Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 319 days.

(21) Appl. No.: 09/939,111

(22) Filed: Aug. 24, 2001

(65) Prior Publication Data
US 2002/0055044 A1 May 9, 2002

(30) Foreign Application Priority Data
Sep. 20, 2000 (TW) .......................................... 89119332 A

(51) Int. Cl.$^7$ ................................................. H01M 6/14
(52) U.S. Cl. .................... 429/303; 429/300; 429/231.9; 429/231.95; 29/623.1; 29/729; 29/730
(58) Field of Search .................................. 29/623.1, 729, 29/730; 429/231.9, 231.95, 303, 300

(56) References Cited

U.S. PATENT DOCUMENTS

| | | | | |
|---|---|---|---|---|
| 5,300,272 A | * | 4/1994 | Simandl et al. | 423/445 R |
| 5,789,107 A | * | 8/1998 | Okada et al. | 429/218.1 |
| 6,503,661 B1 | * | 1/2003 | Park et al. | 429/306 |
| 6,576,370 B1 | * | 6/2003 | Nakagiri et al. | 429/231.95 |

* cited by examiner

*Primary Examiner*—Bruce F. Bell
(74) *Attorney, Agent, or Firm*—Ladas & Parry

(57) ABSTRACT

The present invention discloses a method for preparing a lithium battery with self-adhesive polymer electrolyte. The characteristic of the method is to pour a polyacrylonitrile-based solution into a battery with electrode plates and separators. An organic solvent is then poured into the battery, during which time the polyacrylonitrile-based solution is phase-separated, resulting in the adhesion of the electrode plates and separators.

15 Claims, 4 Drawing Sheets

METHOD FOR FABRICATING A LITHIUM BATTERY WITH SELF-ADHESIVE POLYMER ELECTROLYTE

BACKGROUND OF THE INVENTION

1. Field of the Invention

The present invention relates to rechargeable lithium batteries, and more particularly to a fabrication method for lithium batteries with self-adhesive polymer electrolyte.

2. Description of the Prior Art

In recent years, rechargeable batteries have been widely recognized for their performance by the manufacturers of portable electronic devices. As a result, various specifications and numbers for different applications have expanded rapidly. Moreover, as the design of electronics devices, information and communication devices have all focused on getting smaller and lighter in size, the performance and characteristics of the rechargeable batteries powering them have become an important factor in various products' features.

FIG. 1 and FIG. 2 are schematic representations of the conventional fabrication method for cathode/anode plates of rechargeable batteries. Firstly, cathode/anode active substances and polymer binder, conductivity promoter are mixed to form cathode/anode materials 12a, 12b. Next, the cathode/anode materials are coated onto electron collectors 11a, 11b using a coating machine. FIG. 1 and FIG. 2 differ in the way the coating is cast, with discontinuous coating in FIG. 1, and continuous coating in FIG. 2. The coated cathode/anode plates 10a and 10b are then pressed and formed into strips. Polymer separators are used to isolate the cathode/anode plates from each other. The cathode/anode plates are then rolled to form a cylindrical or oval shape, followed by placement in a cylinder or rectangular metal shell 21. Liquid electrolyte is then poured into the metal shell. The shell is then sealed to complete the fabrication of a cylindrical or rectangular battery.

Recently, with the rapid development of electronic devices, the improvement of rechargeable batteries has focused on the need for smaller sizes, lighter weights, and high energy density. The structure of a traditional rechargeable battery is shown in FIGS. 3 and 4, where rolled cathode plate/polymer separator/anode plates 20, 20a are formed into a circular or rectangular shape and placed in a circular metal shell 21, 21a. This circular structure is quite mature in the industry. However, the metal shell will increase the weight of the battery. Therefore, future trends make use of aluminum foil to package batteries, reducing weight.

Consequently, packaging technology for batteries consists primarily of stacking or rolling, i.e. the stacking method of the so-called current polymer battery (Bell Laboratory, US), as shown in FIG. 5. Theoretically, stacked plates 30 is the most densely packed mode, that is, the space is used the most efficiently. Moreover, with the aluminum shell 31, the weight of the battery is reduced. Consequently, the energy density of the battery is improved as well. However, the non-adhesive nature of the plates and polymer separator (PE, PP or nonwoven fabric) has kept the stacking method from being widely applied in rechargeable batteries (Ni-MH battery, Li-ion battery).

Polymer batteries can be stacked tightly together because the polymer electrolyte film (similar to separators) is more adhesive. However, plates need to be stacked tightly with polylmer electrolyte (films), and therefore, a polymer adhesion agent must be used on cathode/anode plates. The adhesion agent, however, reduces the proportion of active substances on cathode/anode plates, and consequently the energy density is less than that of Li-ion batteries. Furthermore, the adhesion agent causes the reduction of the conductivity of cathode/anode plates, which induces problems in recharging/discharging batteries. Therefore, it is necessary to develop a method for fabricating batteries with sufficient adhesion between plates and separators, while maintaining the energy density and conductivity without the addition of polymer adhesion agents.

There have been proposals using adhesive substances on plates to solve the above problems, however, the manufacturing process for stacked polymer batteries is not the same with the current fabrication process for Lithium batteries. In addition, production and technique for massive production of stacked polymer batteries are not developed enough to be widely adopted. Hence, a novel fabrication method compatible with the current fabrication process is in demand.

SUMMARY OF THE INVENTION

The object of the present invention is to provide a method for fabricating a lithium battery with self-adhesive polymer electrolyte. The method is not only close to the present process for fabricating lithium batteries, but also applies to stacked polymer batteries.

Another object of the present invention is to provide a method for fabricating polymer batteries that is compatible with the present manufacturing process for batteries.

Still another object of the present invention is to provide a battery with adhesive polymer electrolyte and a battery able to provide high energy density.

To achieve the above-mentioned objects, a battery with electrode plates and separators is firstly filled with a polyacrylonitrile-based solution, followed by the addition of an organic solvent to phase-separate the polyacrylonitrile solution to bond the electrode plates and separators together.

The characteristic step of the invention is the heating and dissolving of polyacrylonitrile in a solution, and pouring the polyacrylonitrile-containing solution into a battery while the solution is still in a molten state and flows as a liquid. The means for filling the battery is not limited to pouring only, injecting and dispensing are also applicable. The battery is not limited to rolled plate structure, stacked plates can be applied as well. After the solution is cooled, an organic solution is added to phase-separate the gellacous polyacrylonitrile. Polyacrylonitrile will be separated to form polymer films or bulks, thus bonding the plates and separators together in the battery. This adhesion procedure is compatible with the current manufacturing technique for lithium batteries.

The solution used in the invention is preferably ethylene carbonate, propylene carbonate, or a combination thereof.

A suitable organic solvent is selected from diethyl carbonate(DEC), dimethyl carbonate(DMC), ethyl methyl carbonate(EMC), ethylene carbonate (EC), propylene carbonate (PC), butylene carbonate (BC), r-butyrolactone, 1,2-dimethoxyethane (DME), tetrahydrofuran (THF), 2-methyltetrahydrofuran (2MeTHF) and vinylene carbonate (VC) etc. The above compound can be used alone or as a combination of more than two solvents.

A large number of ions are needed for the electrochemical reaction involved in a battery, and thus, either the solution or the organic solvent contains lithium salts, or they can both contain lithium salts, preferably $LiPF_6$, $LiClO_4$, or $LiBF_4$. The preferred concentration of the lithium salts is 0.5–3M.

According to this invention, the adhesion between plates and separators is excellent, meanwhile, the required ion concentration is also achieved, which means the batteries made has high energy density.

BRIEF DESCRIPTION OF THE DRAWINGS

The present invention will become more fully understood from the detailed embodiments given hereinbelow and the accompanying drawings, given by way of illustration only and thus not intended to be limitative of the present invention.

PREFERRED EMBODIMENTS

A layer-structured battery was prepared as follows: 85% $LiCoO_2$, 10% conductivity promoter KS6 and 5% adhesion agent PVdF were mixed and coated on aluminum foil. A cathode plate was then formed by rolling, pressurizing and striping the foil. 90% MCMB powder and 10% PVdF were mixed and dissolved in NMP to form a coating material, which was then coated onto copper foil. An anode plate was formed by a similar process. Separators PP or PE (Celgard) and the cathode/anode plates were rolled and stacked to form a battery.

1st Embodiment

Figure 1:
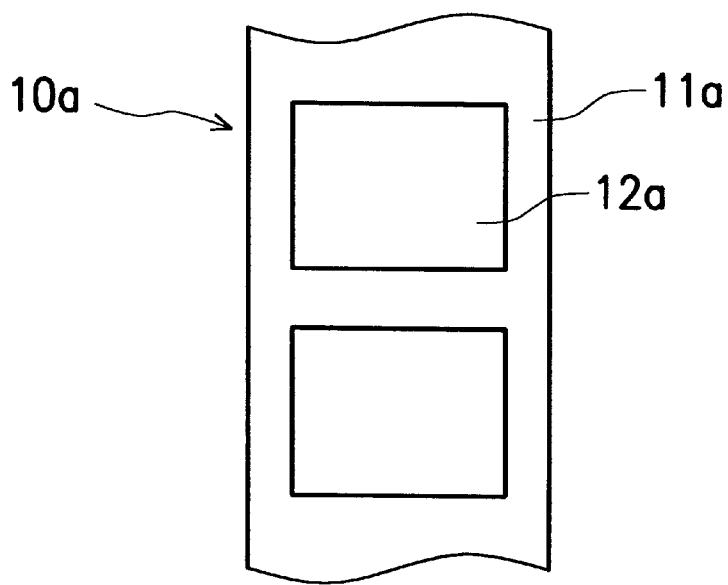
FIGS. 1 and 2 are schematic representations of conventional method for preparing cathode/anode plates of rechargeable batteries.
Figure 2:
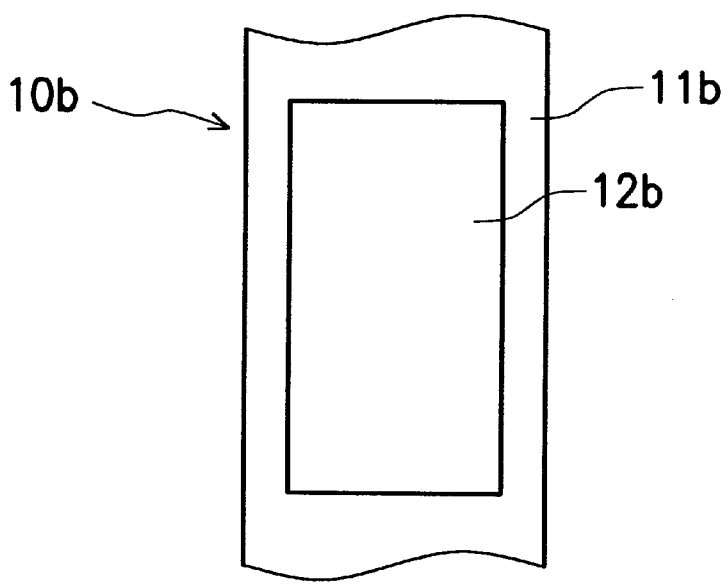
Figure 3:
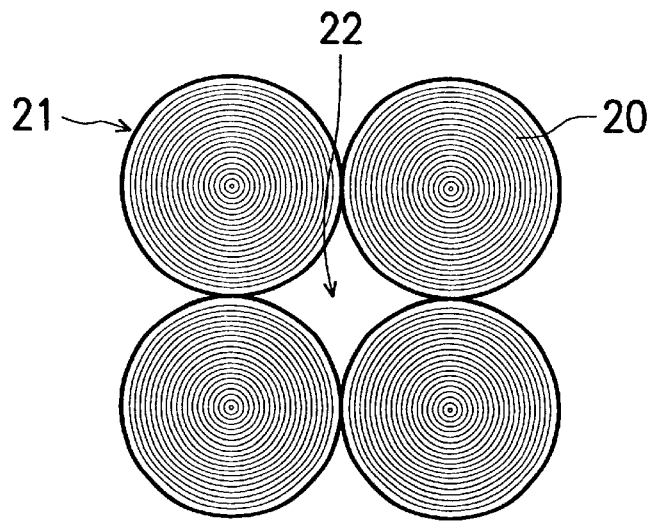
FIGS. 3 and 4 illustrate spherical and oval-shaped batteries with rolled-plate structures.
Figure 4:
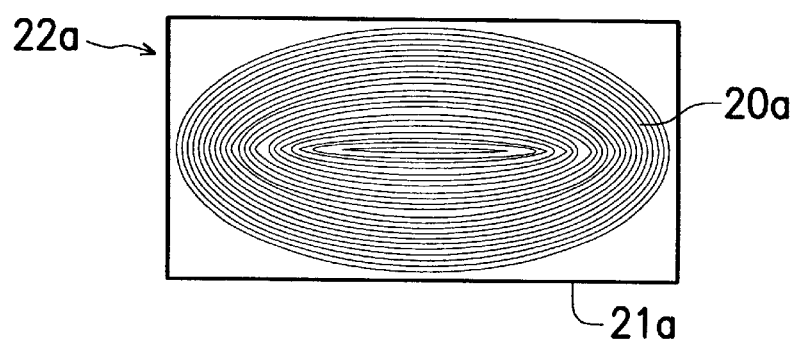
Figure 5:
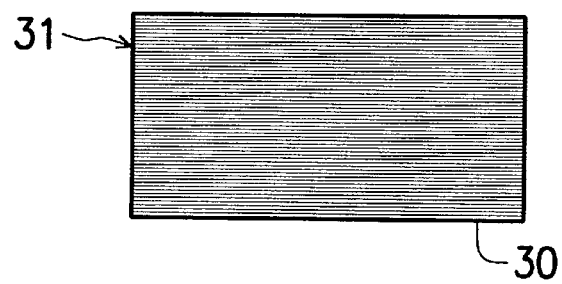
FIG. 5 shows the stacking structure of a battery.
Figure 6:
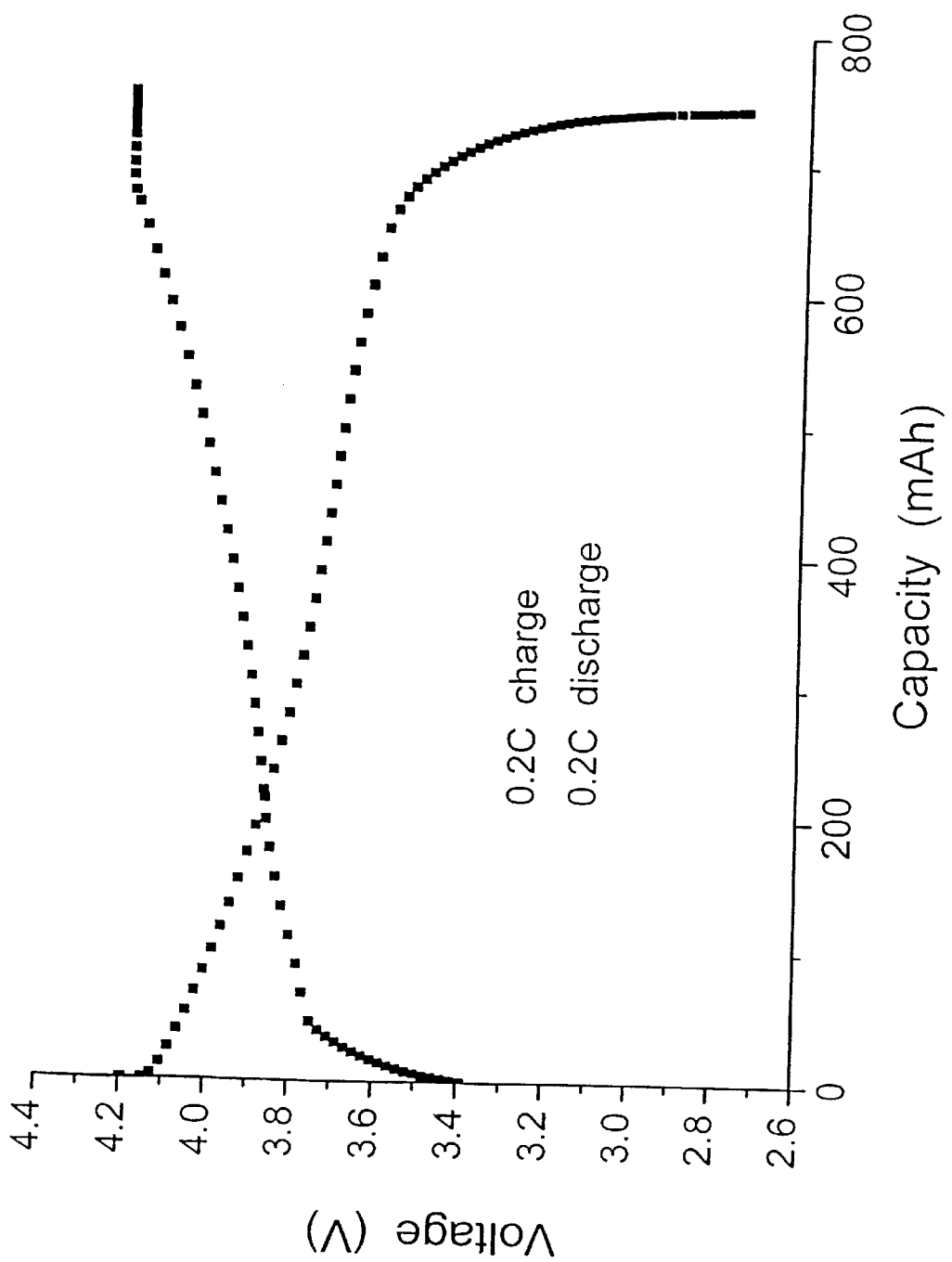
FIG. 6 shows the charge/discharge curve of the 1st embodiment of the invention.

The water content of 20 g of EC and 20 g of PC were removed by a molecular sieve. 7 g of $LiPF_6$ solution was added and mixed to dissolve, followed by adding 6 g of PAN. The mixture was heated to 120° C. so that PAN was dissolved. The resultant solution was poured in vacuum into the battery prepared above. DEC solution with 1M $LiPF_6$ was added to the battery. After sealing the battery, resistance at 1 kHz was tested and the result was listed in Table 1. FIG. 6 shows the curvature of recharge/discharge. Subsequently, the battery was opened to examine the adhesion of the plates with the separators.

Figure 7:
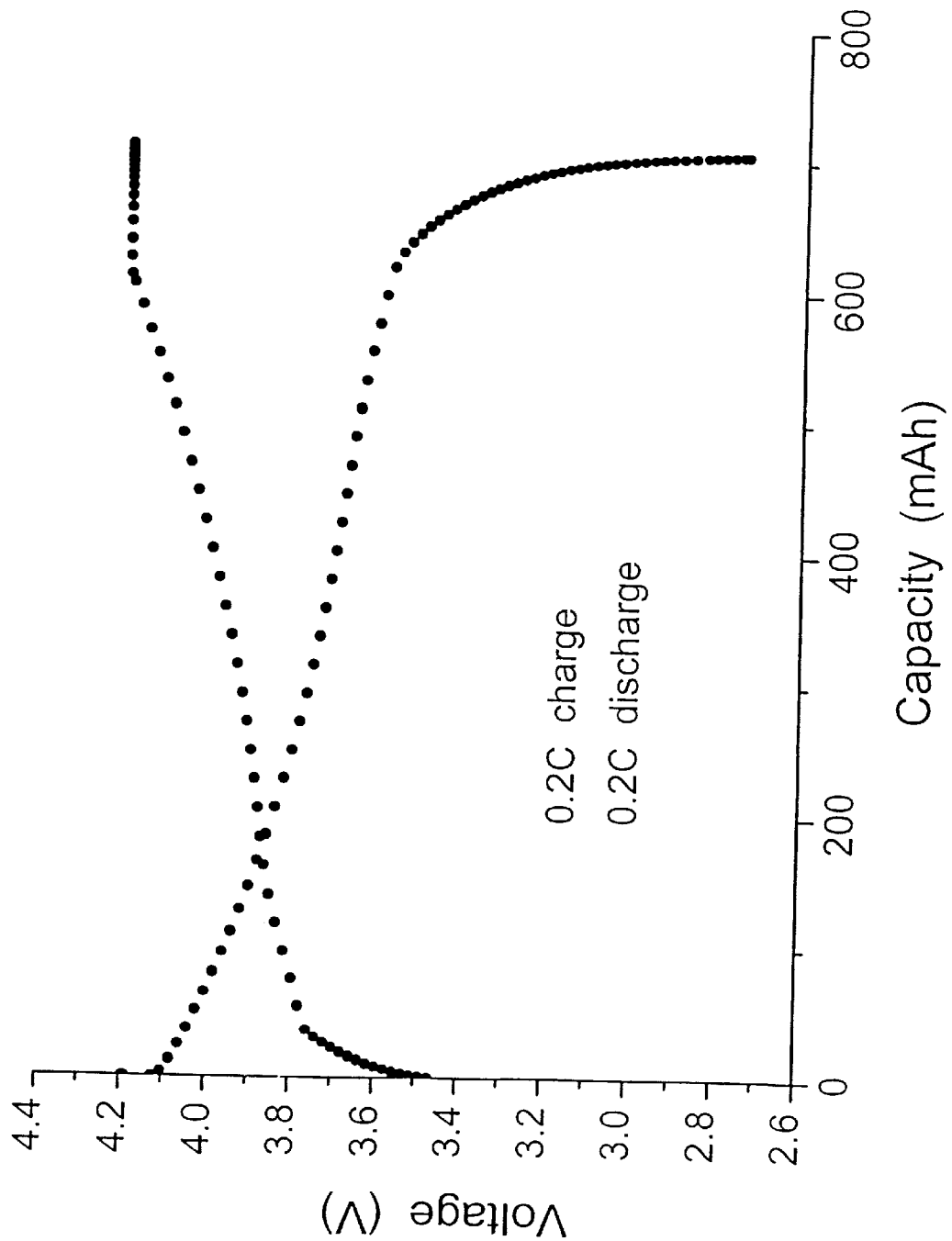
FIG. 7 shows the charge/discharge curve of the 2nd embodiment of the invention.

2nd Embodiment 6 g of PAN was heated and dissolved in 40 g of EC solution with 1M $LiPF_6$. The resultant solution was poured in vacuum into the battery prepared above. A combined solution of DEC with 1M $LiPF_6$ and PC (60:40) was added to the battery. After sealing the battery, resistance at 1 kHz was tested and the result was listed in Table 1. FIG. 7 shows the curvature of recharge/discharge. Subsequently, the battery was opened to examine the adhesion of the plates with the separators.

3rd Embodiment 6 g of PAN was heated and dissolved in 40 g of PC solution with 2M $LiPF_6$. The resultant solution was poured in vacuum into the battery prepared above. A combined solution of DEC and PC (60:40) was added to the battery. After sealing the battery, resistance at 1 kHz was tested and the result was listed in Table 1. Subsequently, the battery was opened to examine the adhesion of the plates with the separators.

4th Embodiment 6 g of PAN was heated and dissolved in 40 g of EC/PC combined solution with 1M $LiPF_6$. 2 g of the resultant solution was poured in vacuum into the battery prepared above, followed by adding 2 g of DMC solution. After sealing the battery, resistance at 1 kHz was tested and the result was listed in Table 1. Subsequently, the battery was opened to examine the adhesion of the plates with the separators.

5th Embodiment 6 g of PAN was heated and dissolved in 40 g of EC/PC combined solution with 1M $LiPF_6$. 2 g of the resultant solution was poured in vacuum into the battery prepared above, followed by adding 2 g of EMC solution. After sealing the battery, resistance at 1 kHz was tested and the result was listed in Table 1. Subsequently, the battery was opened to examine the adhesion of the plates with the separators.

1st Comparative Embodiment

The water content of 20 g of EC and 20 g of PC were removed by a molecular sieve. 7 g of $LiPF_6$ solution was added and mixed to dissolve, followed by adding 6 g of PAN. The mixture was heated to 120° C. so that PAN was dissolved. The resultant solution was poured in vacuum into the battery prepared above. After sealing the battery, resistance at 1 kHz was tested and the result was listed in Table 1. Subsequently, the battery was opened to examine the adhesion of the plates with the separators.

2nd Comparative Embodiment 6 g of PAN was added to 40 g of EC solution with 1M $LiPF_6$. The mixture was heated to dissolve PAN. The resultant solution was poured in vacuum into the battery prepared above. After sealing the battery, resistance at 1 kHz was tested. The results are listed in Table 1.

TABLE 1

|  | Resistance | Adhesion of plates and separators |
| --- | --- | --- |
| 1st Embodiment | 35 mΩ | adhesion |
| 2nd Embodiment | 30 mΩ | adhesion |
| 3rd Embodiment | 40 mΩ | adhesion |
| 4th Embodiment | 35 mΩ | adhesion |
| 5th Embodiment | 38 mΩ | adhesion |
| 1st Comparative Embodiment | >3 MΩ | no adhesion |
| 2nd Comparative Embodiment | >4 MΩ | no adhesion |

From Table 1, it is observed that the batteries of Embodiments 1–5 not only have desired power levels, but also maintain satisfactory adhesion between plates and separators. In contrast, in the comparative embodiments, the obtained batteries contain too much resistance, failing the recharge test. Furthermore, the adhesion between plates and separators is insufficient.

According to the method for preparing a lithium battery with self-adhesive polymer electrolyte of the invention, batteries that meet both the required energy density and sufficient adhesion between plates and separators are prepared.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for preparing a lithium battery with self-adhesive polymer electrolyte, comprising:

dissolving polyacrylonitrile in a solution;

filling a battery with electrode plates and separators with the polyacrylonitrile solution; and filling the battery with an organic solvent, wherein the gelllacous polyacrylonitrile solution is phase-separated and the electrode plates and the separators of the lithium battery adhesive with each other.

2. The method as claimed in claim 1, wherein the means for filling the battery is selected from the group consisting of pouring, injecting and dispensing.

3. The method as claimed in claim 1, wherein the electrode plates and separators are rolled or stacked.

4. The method as claimed in claim 1, wherein the solution is ethylene carbonate, propylene carbonate or the combination thereof.

5. The method as claimed in claim 1, wherein the organic solvent is a single solvent system or at least two selected from the group consisting of diethyl carbonate(DEC), dimethyl carbonate(DMC), ethyl methyl carbonate(EMC), ethylene carbonate (EC), propylene carbonate (PC), butylene carbonate (BC), r-butyrolactone, 1,2-dimethoxyethane (DME), tetrahydrofuran (THF), 2-methyltetrahydrofuran (2MeTHF) and vinylene carbonate(VC).

6. The method as claimed in claim 5, wherein the concentration of the lithium salt is 0.5–3M.

7. The method as claimed in claim 5, wherein the lithium salt is $LiPF_6$, $LiClO_4$ or $LiBF_4$.

8. The method as claimed in claim 1, the solvent further comprising lithium salt.

9. The method as claimed in claim 8, wherein the concentration of the lithium salt is 0.5–3M.

10. The method as claimed in claim 8, wherein the lithium salt is $LiPF_6$, $LiClO_4$ or $LiBF_4$.

11. The method as claimed in claim 1, the organic solvent further comprising lithium salt.

12. The method as claimed in claim 11, wherein the concentration of the lithium salt is 0.5–3M.

13. The method as claimed in claim 11, wherein the lithium salt is $LiPF_6$, $LiClO_4$ or $LiBF_4$.

14. The method as claimed in claim 1, the solution and the organic solvent further comprising lithium salt.

15. A lithium battery prepared by the method as claimed in claim 1.

* * * * *